Aug. 17, 1926.
H. J. J. VAN DEN BOOGAARDT
1,596,780
PACKAGE FOR FLAT FILMS FORMING A CHANGER
Filed Feb. 6, 1924
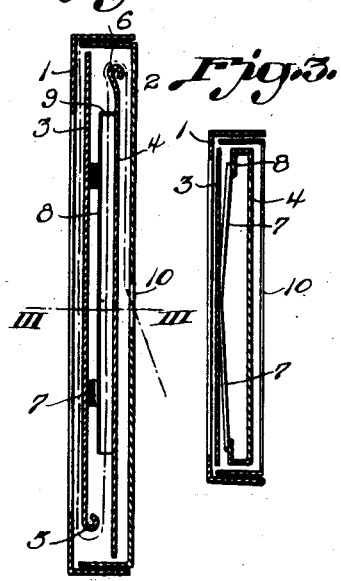
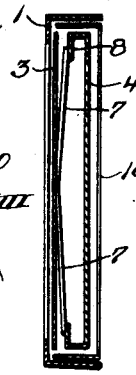
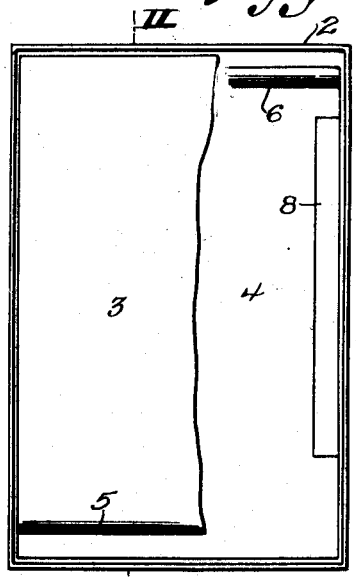
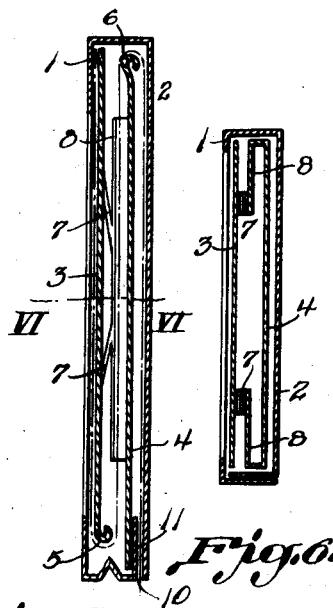
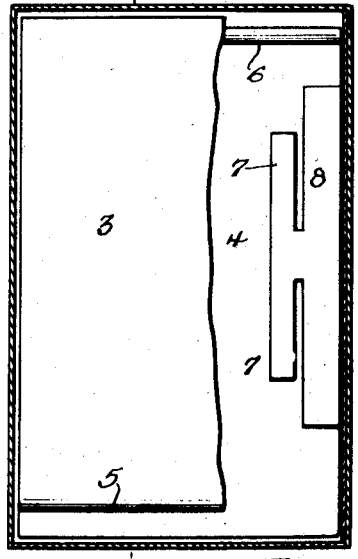
Inventor
Hendricus J. J. van den Boogaardt
by Wm. H. Babcock & Son
Attorneys Patented Aug. 17, 1926.

1,596,780

UNITED STATES PATENT OFFICE.

HENDRICUS JACOBUS JOHANNES van den BOOGAARDT, OF THE HAGUE, NETHERLANDS, ASSIGNOR TO NAAMLOOZE VENNOOTSCHAP TOT EXPLOITATIE VAN DEN BOOGAARDT'S OCTROOI, OF THE HAGUE, NETHERLANDS.

PACKAGE FOR FLAT FILMS FORMING A CHANGER.

Application filed February 6, 1924, Serial No. 691,052, and in the Netherlands February 14, 1923.

The present invention relates to a package for flat films forming a changer and provided with a partition between the exposed and unexposed films.

In the known filmpacks of this kind the films and the tabs fixed thereto are U-shaped bent within the case, the tabs projecting through an opening provided in the top-side of the case in such a manner as to allow the tabs to be pulled out while remaining in a plane passing through the back leg of the U.

During the exposure the films are lying in the plane passing through the front leg of the U, and after exposure the films are changed by pulling out the tab fixed to the exposed film until further movement of the film is prevented by a stop provided inside of the case; the film is then lying in the place passing through the back leg of the U.

In connection with this kind of filmpacks it is a general complaint, that notwithstanding the edges of the exit being provided with velvet linings, still light penetrates through said exit into the back compartment of the filmpack and reaches the exposed films.

This defect is felt especially in the case that not all the films contained in the film pack are developed at the same time, but a part of same after being exposed is removed for the purpose of being developed, as in this case only the projecting tabs of the remaining films pass through the exit, in consequence whereof a relatively large quantity of light is allowed to penetrate into the interior of the film pack.

A further disadvantage of the film pack of this kind consists therein, that for extracting the exposed films, the film pack must be removed from the adapter and be opened. If only a part of the films contained in the film pack is to be extracted, then the film pack afterwards must be closed again and replaced into the adapter. These operations are so complicated and difficult to achieve, that they can only be accomplished in a dark room.

By this invention such disadvantages are overcome absolutely.

The invention consists therein that a partition is provided between the exposed films and the exit, through which the projecting tabs pass, said partition being about parallel to the partition provided between the exposed and unexposed films.

In the film pack according to the present invention the films and projecting tabs are S-shaped bent; further the partition between the unexposed and exposed films may be formed as the first, and the partition between the exposed films and the exit-opening as the second point of inflection, and the exit may be arranged in the back side of the film pack, as by doing so the film pack is not only closed absolutely light-tight, but by the action of the springs, which in the known film packs of this kind press the partition between the exposed and unexposed films on the front side of the film pack, in the film pack according to the present invention the second partition is also pressed on the back side of the film pack, causing thereby the film pack to remain closed light-tight, even if a smaller than the usual number of tabs pass through the exit.

The provision of the exit in the back side of the film pack, in which case of course the adapter can be provided with a corresponding aperture has still the further advantage that for example a film pack of 6 x 9 centimeters can be used in a camera and adapter for film packs of 9 x 12 centimeters by providing the said adapter with a veneering frame of the type already known in connection with the use of photographic glass plates.

By this arrangement the operations, which are necessary for extracting the exposed films, are simplified to such an extent that they can be executed in a sleeve closing light-tight round the wrists of the operator and consisting of a material impermeable to light. As further in such a sleeve the extracted films can easily be transferred into a developing box, in using my film pack, it is possible to extract each exposed film after exposure and to develop the same in daylight without the use of a dark room.

The removing of the exposed films from the film pack without opening the latter can also be obtained with projecting tabs passing through an exit provided at the top or bottom side of the film pack on condition that the said exit has such a width that also the films pass through the same. In this case the existing adapter can be used without any alterations but then the same must be opened for allowing the films to be extracted.

Referring to the drawings, in which similar numerals indicate the same parts throughout the several views and in which two embodiments of the present invention are illustrated, Fig. 1 is a front view of the film pack after removal of the front plate, in which the partition between the unexposed and exposed films is partially broken away.

Fig. 2 is a vertical section through the line II—II of Fig. 1.

Fig. 3 is a horizontal section through the line III—III of Fig. 2.

Fig. 4 shows the same view as illustrated in Fig. 1, of another embodiment in which the tabs pass through an exit, provided at the bottom side of the film pack.

Fig. 5 is a vertical section through the line V—V of Fig. 4.

Fig. 6 is a horizontal section through the line VI—VI of Fig. 5.

The film pack consists of a front plate 1, provided in the known manner with an exposure opening and of a back plate 2, provided in Figs. 1, 2 and 3, with a slot 10 through which the tabs pass. The slot 10 has such a width that also the film may be drawn out through the same. In Fig. 1, 2 and 3 the edges of the front plate 1 and the back plate 2 are bent up in such a manner that they form together a case. Within the loaded case a partition 4 is provided between the exposed films and the exit or slot 10 for the tabs, the top edge 6 of said partition being shaped so as to form the upper point of inflection of the films and projecting tabs. The side edges of the partition 4 are double bent, whereby supports 8 are formed for the springs 7 fixed in Figs. 1, 2 and 3 to the partition 3 provided between the unexposed and exposed films. The bottom edge 5 of said partition 3 forms the lower point of inflection of the films and tabs. The double bent side edges of the partition 4 also forms grooves, in which the exposed films are drawn and which may be partially closed at the top by plates 9, as indicated on the drawings Fig. 3, in order to form stops for the exposed films if only a light-tight film pack is wanted.

In the embodiment as illustrated in Figs. 4, 5 and 6 the films are packed in a carton case. The springs 7 are connected to the supports 8 of the back plate 4 and the tabs pass through an exit provided in the bottom side of the case between the said back plate 4 and the back wall 2, said bottom side, the extreme of which is bent round the bottom edge of the plate 4, being shaped by means of a fold in such a manner as to allow a displacement of the plate 4 under the action of the springs 7.

In Figs. 2 and 5 the position of the unexposed films and tabs is indicated by chain lines.

What I claim is:

1. In a package for flat films forming a changer, a casing having an exposure opening and an exit for the tab fixed to the films, a number of supperposed films and tabs forming a layer folded upon itself is spaced relation, a partition between the unexposed and the exposed films, and a second partition between the latter and the exit through which the tabs pass, both partitions being about parallel to each other.

2. In a package for flat films forming a changer, a casing having an exposure opening and an exit for the tabs fixed to the films arranged in the back plate of the casing, a number of superposed films and tabs forming a layer folded upon itself in spaced relation, a partition between the unexposed and the exposed films, and a second partition between the latter and the exit through which the tabs pass, both partitions being about parallel to each other.

3. In a package for flat films forming a changer, a casing having an exposure opening and an exit for the tabs fixed to the films of such a width that also the films may be drawn out through the same, a number of superposed films and tabs forming a layer folded upon itself in spaced relation, a partition between the unexposed and the exposed films, and a second partition between the latter and the exit through which the tabs pass, both partitions being about parallel to each other.

4. In a package for flat films forming a changer, a casing having an exposure opening and an exit for the tabs fixed to the films, a number of superposed films and tabs forming a layer folded upon itself in spaced relation, a partition between the unexposed and the exposed films, serving as a support over which the films are bent in being changed and a second partition between the latter and the exit through which the tabs pass, being about parallel to the first one and serving as a support over which the films are bent in being drawn out of the package.

In testimony whereof, I have signed my name to this specification.

HENDRICUS JACOBUS JOHANNES
van den BOOGAARDT.